Patented June 16, 1925.

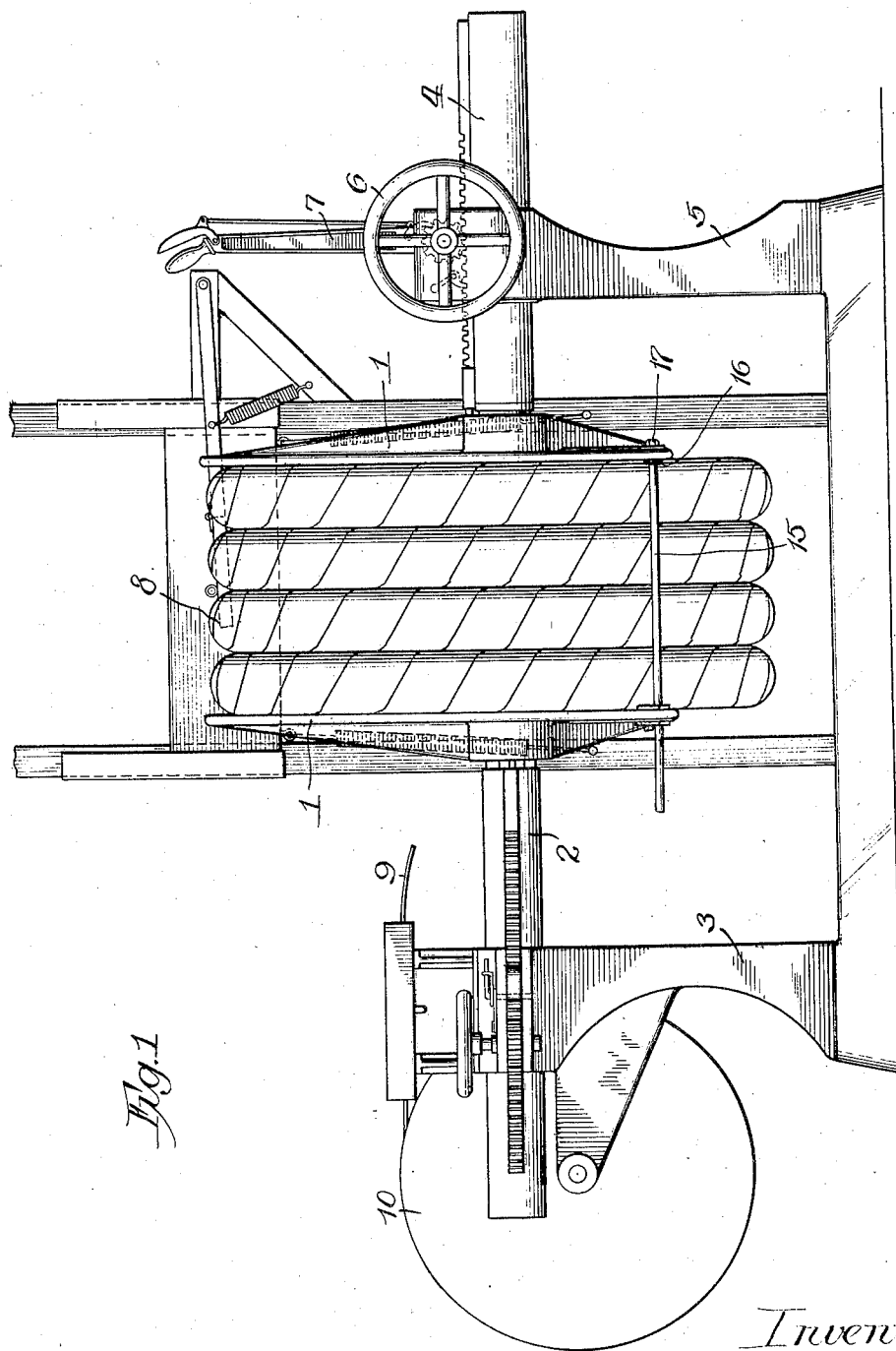

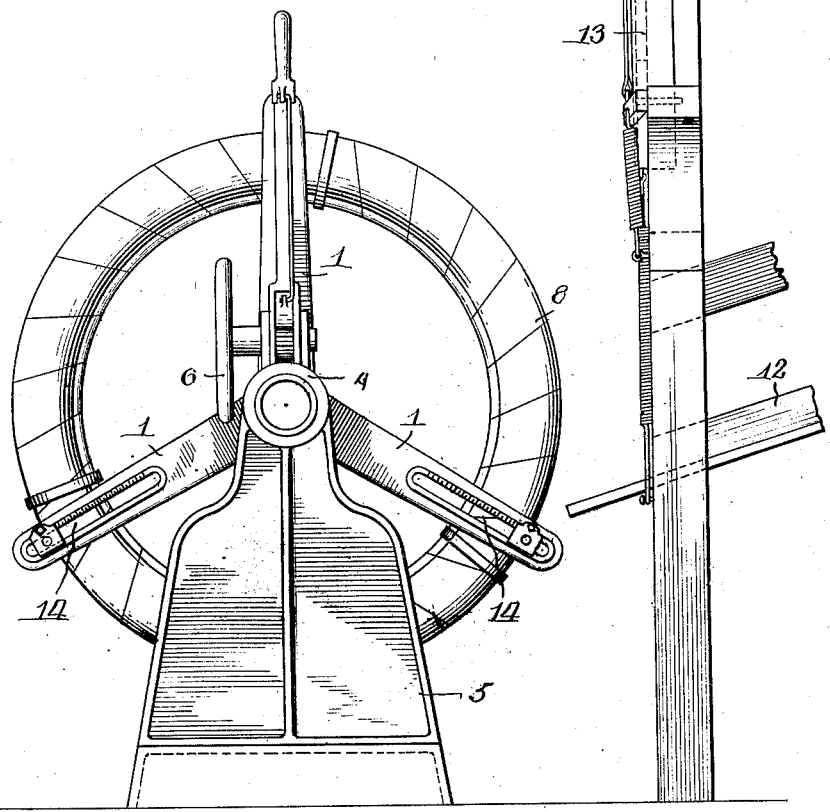
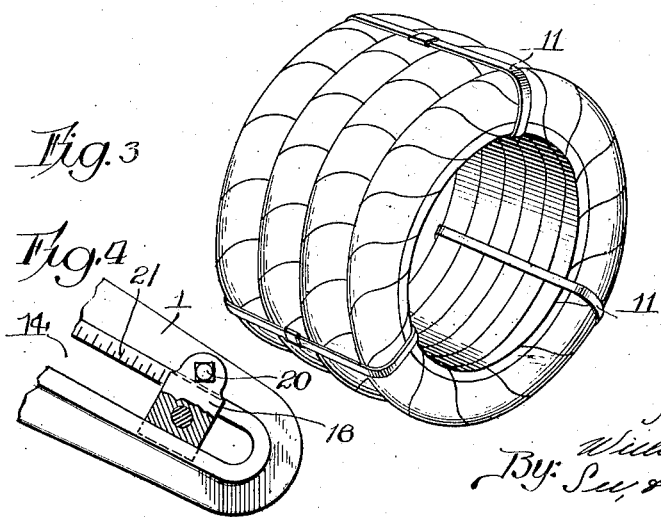
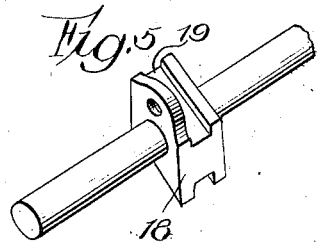

1,542,255

UNITED STATES PATENT OFFICE.

JOHN W. LESLIE, OF EVANSTON, ILLINOIS, ASSIGNOR TO SIGNODE SYSTEM, INC., OF CHICAGO, ILLINOIS, A CORPORATION OF DELAWARE.

TIRE-STRAPPING PRESS.

Application filed June 29, 1921. Serial No. 481,212.

*To all whom it may concern:*

Be it known that I, JOHN W. LESLIE, a citizen of the United States, and a resident of Evanston, in the county of Cook and State of Illinois, have invented certain new and useful Improvements in Tire-Strapping Presses, of which the following is a specification.

This invention relates to a tire strapping press. The invention is an improvement upon a tire strapping press disclosed in application Serial No. 440,719 filed January 28, 1921 by Charles T. Ridgely. The machine disclosed by Ridgely appears in substantially the same form herein. The improvement concerns the means whereby a certain carriage for raising and lowering the tires may be eliminated from the Ridgely machine.

In the drawings:

Fig. 1 is a side elevation of the machine,

Fig. 2 is an end elevation thereof,

Fig. 3 is a perspective view of a completed package or bundle of tires,

Fig. 4 is an elevation of a part of one of the spiders, and

Fig. 5 is a perspective view of a sliding block and rod used in the machine.

Referring to Fig. 1, the machine in general comprises a pair of revolvable spiders 1, one of which (on the left, Fig. 1) is mounted on a stationary but adjustable shaft 2, slidable in the standard 3 on the left hand side of the machine; the other of which is revolvably mounted on the shaft 4 slidable longitudinally on the standard 5 at the other end of the machine. By means of a hand wheel 6, a lever 7, and other mechanism, not specifically involved in this invention, the right hand spider 1 (Fig. 1) may be moved back and forth to apply compression on a bundle of tires 8, squeezing these tires against the stationary but adjustable spider 1 on the left. The spiders may be revolved and a strap 9 drawn from the reel 10 and applied to the tires to form the reinforcing bands 11, shown in Fig. 3, all as described more fully in the said copending application.

The chute 12, provided with a gate mechanism 13 for releasing one rank at a time of tires, three or four abreast, to feed the same to the machine, is also disclosed.

In the Ridgely application referred to there is provided a cradle situated below the spiders 1 which receives the tires as they are discharged from the chute 12 and mechanism whereby the operator may elevate and lower the cradle. This mechanism is herein dispensed with and in its place, I modify the construction of the spiders 1. Thus, referring to Fig. 2, I slot two of the spiders, as shown at 14, it being understood that the opposite pair is also slotted.

The rods 15 are mounted in the slotted spider arms, each rod being provided with a shoulder 16 and a cooperating bolt 17 adjacent one end; at the other end they pass freely through the block 18, grooved as shown at 19, this block being mounted in the slot 14 as shown in Fig. 4. A bolt 20 serves to fix the block adjustably on the spider arm. Each pair of spider arms is provided with scales 21 by which in an obvious manner the rods 15 may adjustably be positioned to bring tires of varying sizes concentric with the spiders.

In operation, the tires are discharged from the chute 12 directly onto the two rods 15, as shown in Figs. 1 and 2, these rods having been previously adjusted correctly to position tires of the size being bundled. Pressure is next applied to compress the tires between spiders, and the strapping is applied to produce the tire bundle shown in Fig. 3, as disclosed in the Ridgely application above referred to.

Having described my invention, I claim:—

1. In apparatus of the class described, and in combination, a pair of separately adjustable compressing means, having a compressing movement in a horizontal direction, adapted to compress and hold a plurality of tires, and facilitate their being formed into a bundle; and radially adjustable means whereby said tires may be supported directly from the compressing means.

2. In apparatus of the class described, and in combination, a pair of independently movable compressing means, having a compressing movement in a horizontal direction, adapted to compress and hold a plurality of tires, and facilitate their being formed into a bundle; means whereby said tires may be supported directly from the compressing means, said means being rotatable with said compressing means and being adapted to permit the compressing movement of the compressing means.

3. In apparatus of the class described, and in combination, a pair of revoluble compressing members, mounted to compress and hold tires, while maintaining the same with their axes substantially horizontal, and supporting bars carried by said compressing members to hold the tires in proper relationship to the latter.

4. In apparatus of the class described, and in combination, a pair of revoluble compressing members, mounted to compress and hold tires, while maintaining the same with their axes substantially horizontal, supporting bars carried by said compressing members to hold the tires in proper relationship to the latter, said bars being adjustable toward and away from the axis of revolution of said compressing members.

5. In apparatus of the class described, and in combination, a pair of revoluble compressing members having a plurality of compressing arms, and rods adjustably mounted in two of said arms to support the tires.

6. In apparatus of the class described, and in combination, rotatable compressing means, having a compressing movement in a horizontal direction, adapted to compress and hold a plurality of tires, and facilitate their being formed into a bundle; means whereby said tires may be supported directly from the compressing means, said latter means permitting rotation of said tires with said compressing means, and tire feeding means adapted to feed tires into said supporting means.

7. In apparatus of the class described, the combination of a pair of revoluble compressing members, means for moving said compressing members towards each other, and supporting means carried by one of said compressing members and rotatable therewith.

In witness whereof, I hereunto subscribe my name this 22 day of June, A. D., 1921.

JOHN W. LESLIE.